United States Patent [19]

Buse

[11] Patent Number: 5,056,939
[45] Date of Patent: Oct. 15, 1991

[54] JOURNAL BEARING RETAINER SYSTEM

[75] Inventor: Frederic W. Buse, Allentown, Pa.

[73] Assignee: Ingersoll-Rand Company, Woodcliff Lake, N.J.

[21] Appl. No.: 551,991

[22] Filed: Jul. 12, 1990

[51] Int. Cl.⁵ ............................................. F16C 33/08
[52] U.S. Cl. ................................................. 384/295
[58] Field of Search ..................... 384/295, 906, 276; 277/136, 137

[56] References Cited

U.S. PATENT DOCUMENTS

| | | |
|---|---|---|
| 1,220,991 | 3/1917 | McGinley . |
| 2,428,177 | 9/1947 | Phillips ................................ 277/136 |
| 3,355,197 | 10/1965 | Tessmer . |
| 3,623,782 | 11/1971 | Nakanishi et al. ................... 384/906 |
| 4,095,803 | 6/1978 | Meier et al. . |
| 4,334,714 | 6/1982 | Gargrave . |
| 4,601,590 | 7/1986 | Arii et al. ............................ 384/906 |

Primary Examiner—Lenard A. Footland
Attorney, Agent, or Firm—James R. Bell; David W. Tibbott

[57] ABSTRACT

A bearing system including a pair of axially spaced bearing sleeves supporting a shaft extending through the sleeves with the bearing sleeves located and retained in the bore of a bearing holder. Each bearing sleeve contains a flat extending across its periphery and a Woodruff key is seated in an undercut slot formed in the bore of the holder. The Woodruff key contains a flat top engaging the flat on the periphery of the bearing sleeve to lock the bearing sleeve against rotating in the bore in the holder and the side of the Woodruff key prevents the bearing sleeve from moving axially toward the Woodruff key.

4 Claims, 1 Drawing Sheet

JOURNAL BEARING RETAINER SYSTEM

BACKGROUND OF THE INVENTION

This invention relates generally to journal bearings and more specifically to a retainer system for journal bearings. More particularly, this invention relates to a retainer system for use with journal bearing sleeves made of a hard brittle material, for example, silicon carbide.

Conventional journal bearing sleeves are installed in holders by methods such as pressing, shrink fitting, adhesives, and interference rings. Bearing sleeves installed using these methods are frequently not in proper alignment after installation and need to be machined in order to place them in proper alignment.

A bearing sleeve made of silicon carbide cannot be pressed into stainless steel because it galls the stainless steel. It cannot be machined and is subject to breaking under bending or tension stresses. It cannot be drilled or tapped which would be necessary for the use of screws to fasten it in a holder. Thus, it must be installed in correct alignment to avoid problems.

The foregoing illustrates limitations known to exist in present devices and methods. It is apparent that it would be advantageous to provide an alternative directed to overcoming one or more of the limitations set forth above. Accordingly, a suitable alternative is provided including features more fully disclosed hereinafter.

SUMMARY OF THE INVENTION

It is an object of this invention to provide a journal bearing mounting system that can be used with bearing sleeves made of hard brittle material, such as silicon carbide, which will enable the bearing sleeve to be in proper alignment after installation.

The invention includes a Woodruff key placed in an undercut slot extending circumferentially around the bore of a holder containing a bearing sleeve and projecting into a flat cut on one end of the bearing sleeve to lock the bearing sleeve against rotating in the bore of the holder and moving axially toward the Woodruff key.

The foregoing and other aspects will become apparent from the following detailed description of the invention when considered in conjunction with the accompanying drawing figures. It is to be expressly understood, however, that the drawing figures are not intended as a definition of the invention but are for the purpose of illustration only.

DESCRIPTION OF PREFERRED EMBODIMENT

Figure 1:
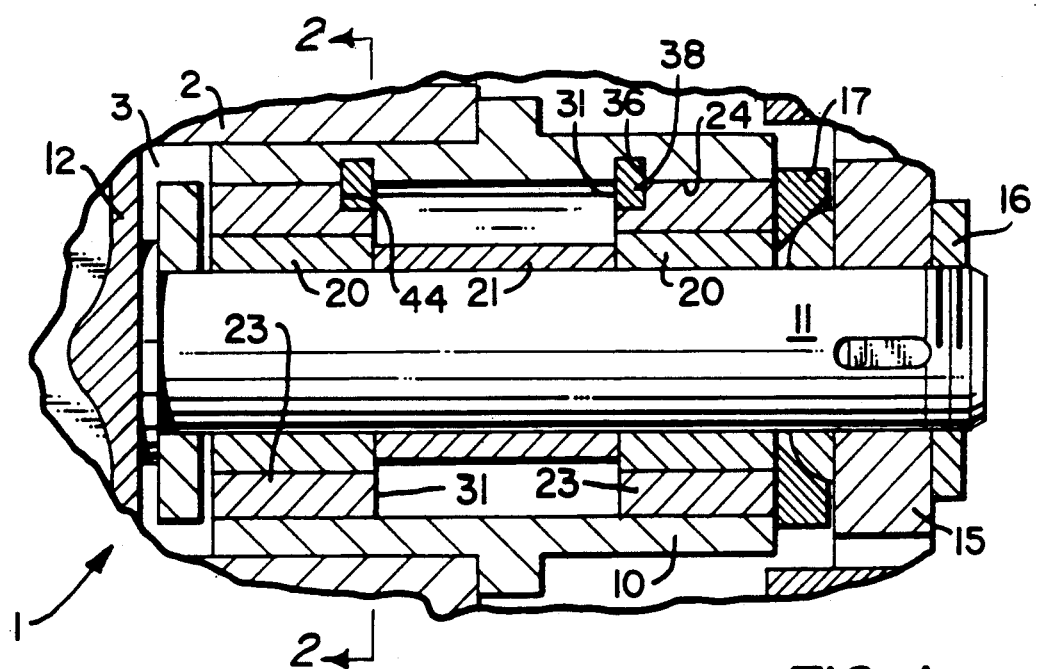
FIG. 1 is a cut away view of an axial section of a sealless type of centrifugal pump taken along the axis of the pump shaft and illustrating the invention used in the mounting of the journal bearings for the pump shaft.
Figure 2:
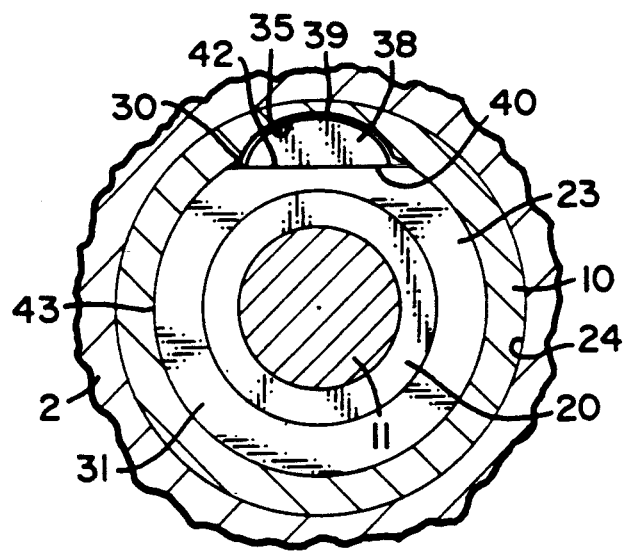
FIG. 2 is a cross-section of FIG. 1 taken along line 2—2 in FIG. 1.

The apparatus shown in the drawings includes a pump 1 (shown partly in FIG. 1) including a casing 2 enclosing a pumping chamber 3 and containing a number of components including a bearing holder 10 fixed in the casing 2 and, in turn, containing an axially extending shaft 11 connected to a semi-open pump impeller 12 rotating in the pumping chamber 3. Further details of this type of pump are disclosed in U.S. Pat. No. 4,871,301, issued Oct. 3, 1989, titled "Centrifugal Pump Bearing Arrangement", invented by Frederic W. Buse.

The end of the shaft 11 opposite from the impeller carries a drive rotor 15 keyed thereon and held in place by a nut 16. A thrust bearing 17 is located between the nut 16 and the holder 10. The shaft 11 carries a pair of bearing journals 20 separated by a spacing sleeve 21. The bearing journals 20 are fixed on the shaft 11 and are normally pressed on the shaft 11 with a interference fit.

The bearing journals 20 rotate in a corresponding pair of bearing sleeves 23 seated in the bearing holder 10 wherein they are locked against rotating in the holder 10. Normally, the bearing sleeves are made of a hard material, such as silicon carbide which cannot be machined. The subject of this invention is the system for mounting the bearing sleeves 2 in the holder 10.

Each bearing sleeve 23 must be prevented from rotating in the bore 24 of the holder 10 while being held against moving axially in the bore 24. The impeller 12 and the thrust bearing 17 prevent the bearing sleeves 23 from moving outward toward the ends of the shaft 11 and the bearing mounting system of this invention prevents the two bearing sleeves from moving axially toward each other on the shaft 11.

The bore 24 contains an arcuate undercut slot 30 located at the inner end 31 of each bearing sleeve 23 with the length or major dimension of the slot 30 extending circumferentially about the bore 24. Due to being undercut, the slot contains an arcuate bottom 35 bordered by a pair of sidewalls 36.

A Woodruff key 38 contains an arcuate bottom 39 having a profile similar to the bottom 35 of the slot 30 and is dimensioned to sit in the slot 30 as shown in the drawings. Due to the arcuate profile of the bottoms of the slot 30 and the key 38, the key 38 can slide along its length in the slot 30 for a limited amount of movement, thus providing a small amount of movement of the key for adjustment purposes.

The Woodruff key 38 also includes a flat top 40 and the inner end 31 of the adjacent bearing sleeve 23 includes a flat 42 cut tangentially across its outer periphery 43. The flat 42 is dimensioned to engage the top 40 of the Woodruff key 38 to lock the bearing sleeve 23 against rotating in the bore 24 of the holder 10.

The flat 42 on the Woodruff key 38 is accompanied by a shoulder 44 which engages a side of the Woodruff key 38 to prevent the bearing sleeve 23 from moving axially toward the other bearing sleeve 23.

Each bearing sleeve 23 has its own bearing retainer system or device in the form of the Woodruff key 38 and corresponding slot 30 and flat 42, serving to lock each bearing sleeve in place in the pump while holding each bearing sleeve 23 in place within the bearing holder 10.

Each bearing sleeve 23 is installed in the holder bore 24 by the placement of the Woodruff key 38 in the slot 30 and thereafter sliding the bearing sleeve 23 axially until the flat 42 engages the Woodruff key with the shoulder 44 engaging the side of the woodruff key 38. Mounting the bearing sleeve 23 loosely in the holder bore 24 allows the bearing sleeve 23 to adjust itself to proper alignment upon the installation of the shaft 11.

While this invention has been illustrated and described in accordance with a preferred embodiment, it is recognized that variations and changes may be made therein without departing from the invention as set forth in the claims.

Having described the invention, what is claimed is:

1. A bearing retainer system comprising: a hollow cylindrical bearing holder containing a bore for holding a bearing sleeve and containing an undercut slot extending circumferentially over a portion of the bore and having an arcuate bottom and spaced sidewalls facing axially; a bearing sleeve mounted in said bore and having a cylindrical periphery containing a notch forming an axially facing shoulder; and a key seated in said slot and extending into said bore and said notch to lock said bearing sleeve against rotating in said bore, said key having an arcuate bottom corresponding to and engaging the arcuate bottom of said slot whereby said key can slide circumferentially in said slot to adjust itself to proper position in the assembled condition of said system, said key engaging said sidewalls in said slot to prevent it from moving axially in said holder, said key engaging said shoulder to prevent said bearing sleeve from moving axially in said bore in at least one direction.

2. The bearing retainer system of claim 1 wherein said holder contains a pair of axially aligned bearing sleeves, each said bearing sleeve being mounted in said holder using said bearing retainer system.

3. The bearing retainer system of claim 1 wherein said notch forms a flat surface facing outwardly in said bearing sleeve and is open at one end of the bearing sleeve wherein said bearing sleeve can be moved axially to engage said key after the key is positioned in said slot.

4. The bearing retainer system of claim 3 wherein said key is Woodruff key having its major dimension located to extend circumferentially around the bore of the holder.

* * * * *